United States Patent [19]

Starner et al.

[11] Patent Number: 5,334,654
[45] Date of Patent: Aug. 2, 1994

[54] FLEXIBILIZED POLYEPOXIDE RESINS

[75] Inventors: William E. Starner, Nesquehoning; Susan G. Musselman, Allentown, both of Pa.

[73] Assignee: Air Products and Chemicals, Inc., Allentown, Pa.

[21] Appl. No.: 56,728

[22] Filed: May 3, 1993

[51] Int. Cl.$^5$ ............................................. C08L 63/00
[52] U.S. Cl. ................................ 524/849; 525/107; 528/75; 528/119; 252/182.18
[58] Field of Search .................. 524/849; 525/107; 528/75, 119; 252/182.18

[56] References Cited

U.S. PATENT DOCUMENTS

| | | | |
|---|---|---|---|
| 3,993,708 | 11/1976 | Brinkman et al. | 260/830 P |
| 4,182,830 | 1/1980 | Ford, Jr. | 528/75 |
| 4,552,933 | 11/1985 | Sellstrom et al. | 525/454 |
| 4,613,660 | 9/1986 | Goel et al. | 528/73 |
| 4,824,919 | 4/1989 | Baker et al. | 525/502 |

FOREIGN PATENT DOCUMENTS

| | | |
|---|---|---|
| 3536246A1 | 6/1986 | Fed. Rep. of Germany . |
| 1399257 | 4/1983 | United Kingdom . |

*Primary Examiner*—Maurice J. Welsh
*Attorney, Agent, or Firm*—Russell L. Brewer; James C. Simmons; William F. Marsh

[57] ABSTRACT

This invention relates to improved polyepoxide resins having enhanced physical and elastic properties. The polyepoxide resins comprise an polyepoxide resin based on a polyglycidyl ether of a phenolic type compound and an acrylate terminated urethane prepolymer. The improvement in the polyepoxide resin formulation comprises incorporating an aliphatic, aliphatic ether or ester component having monofunctional reactivity with an amine hydrogen and an amine curative having from 3 to 10, and preferably 3 to 5 epoxide reactive hydrogen atoms into the epoxy resin. The presence of the monofunctional and aliphatic amine reactive component along with the acrylate terminated urethane prepolymer results in an epoxy resin having the enhanced properties.

14 Claims, No Drawings

FLEXIBILIZED POLYEPOXIDE RESINS

FIELD OF THE INVENTION

This invention pertains to epoxy resins having enhanced flexibility and elongation.

BACKGROUND OF THE INVENTION

Civil engineering and industrial coating industries require economical, environmentally safe resin systems which cure at ambient temperature and give good elastomeric properties without compromising the moisture and chemical resistance. Concrete structures, for example, require coatings which are able to withstand impact as well as cover shrinkage-induced cracks which may be present therein.

Aromatic polyepoxide resins, particularly those based upon the use of polyglycidyl ethers of bisphenol A, have widely been used for preparing cast resins and coatings for civil engineering applications. Some of the reasons for success of epoxy resins ill these applications due to their moisture and chemical resistance as well as their ability to bond to a variety of substrates. When the polyepoxide resins are cured with polyamides, the resins, although resistant to chemicals, generally lack elasticity for a multitude of applications and when cured with amines, the polyepoxide resins lose their flexibility and impact strength.

Historically, flexibility in an epoxy resin formulation has been obtained through the use of coal tar or similar additives. Flexibility has also been imparted to an ambient cured epoxy by making gross changes in the cured epoxy structure. These changes have been accomplished by: (1) modifying tile aromatic character to a more aliphatic character; (2) reducing the cross-link density by using a curative with lower functionality or using a high excess of curative; and (3) adding long chain modifiers or flexibilizers in the form of resin, curative, or reactive additive. To achieve flexibilization of the epoxy resin pursuant to method 3, often flexibilizers in excess of sixty percent by weight of the formulation may be required or plasticizers such as nonyl phenol or benzyl alcohol may be used to reduce the concentration of flexibilizer. The use of plasticizers leads, of course, to the presence of fugitive materials.

Representative patents which describe polyepoxide resins and the approach to enhancing the physical properties of the polyepoxide resins are as follows:

German DE 3,536,246 A1 discloses the use of acrylic and methacrylic acid derivatives of urethane prepolymers as flexibilization agents for epoxide resin systems. The patentees disclose the reaction of hydroxy alkyl esters of methacrylic acid or acrylic acid and an isocyanate prepolymer, e.g. toluenediisocyanate-polyether polyol having a molecular weight of from 400 to 6000 as flexibilization agents for glycidyl ethers of bisphenol A. The examples show a curable polyepoxide composition comprising modified epoxy resins on the basis of bisphenol A with levels of acrylate terminated polyurethanes cured with a variety of amine curatives, e.g. polyaminoamides, modified cycloaliphatic polyamines and polyamines.

British Patent 1,399,257 disclose the production of elastic polyepoxide resins comprising a synthetic resin having free epoxide groups with a molecular weight ranging from 300 to 7000, a synthetic resin containing carbamic acid aryl ester groups or a polyalkylene ether polyol and a polyamine. Polyglycidylethers of diphenylol propane (bisphenol A) having epoxy value of from 0.02 to 0.6 and a molecular weight of 340 to 7000 are suggested as being preferred synthetic resins for the production of the elastic polyepoxide systems. Isocyanate prepolymers based upon a variety of polyisocyanates, e.g. toluene-2,6-diisocyanate; aliphatic isocyanates, e.g. 1,6-hexamethylenediisocyanate and isophorone diisocyanate; and bridged isocyanates, e.g. diphenymethanediisocyanate can be used as the carbamic acid aryl ester providing component with the polyamines being various aliphatic polyamines, e.g. alkylene polyamines or polyamidoamines.

U.S. Pat. No. 3,993,708 discloses elastic hardened polyepoxides formed by reacting a liquid polyepoxy resin with amino-terminated hydrolysis products of enamine or ketamine adducts. The adducts are formed by reacting a polyalkylene polyol with a polyisocyanate, either aromatic or aliphatic, to form a prepoymer and then reacting that prepolymer with the reaction product of am aliphatic amine with an aliphatic aldehyde or ketone. Optionally, a monofunctional epoxy compound is added to reduce viscosity.

U.S. Pat. No. 4,182,830 discloses vinyl ester urethane resins characterized by reacting a polyoxyalkylene bisphenol A and a polycarboxylic acid wherein anhydride with a polyfunctional isocyanate and a monohydroxy-terminated ester of acrylic or methacrylic acid. Examples include the reaction of the bisphenol A component with an alkylene oxide and then react the polyether bisphenol A derivative with a saturated or unsaturated aliphatic polycarboxylic acid, e.g. maleic acid or adipic acid.

U.S. Pat. No. 4,824,919 disclose the preparation of flexibilized vinyl esters by reacting a vinyl ester/styrene composition wherein the vinyl esters are formed by reacting polyfunctional epoxide with at least two molecules of unsaturated monocarboxylic acid in stoichiometric amount, a vinyl monomer and a flexibilizing component comprising an acrylate terminated polyurethane. Acrylate terminated isocyanate prepolymers include those formed by the reaction of toluenediisocyanate with polyols having from about 10 to 50 glycol units. Polyglycols having a molecular weight of about 200 are shown to be preferred.

U.S. Pat. No. 4,552,933 discloses polyepoxide resins utilizing an extended amine curing agent. The glycidyl polyethers based upon bisphenol A, for example, are extended with difunctional aromatic diisocyanate polyether prepolymers having an equivalent weight of from 500 to 3000 extended with a polyethylene oxide extended polyamine.

U.S. Pat. No. 4,613,660 discloses the production of polyepoxides having good or excellent high heat resistance comprising a glycidyl polyether and an isocyanate prepolymer.

SUMMARY OF THE INVENTION

This invention relates to improved polyepoxide resins having enhanced physical and elastic properties. The polyepoxide resins comprise an polyepoxide resin based on a polyglycidyl ether of a phenol and an acrylate terminated urethane prepolymer. The improvement in the polyepoxide resin formulation comprises incorporating an aliphatic, aliphatic ether or ester component having monofunctional reactivity with an amine hydrogen and an aliphatic amine curative having at least 3 to 10, and preferably 3 to 4 epoxide reactive hydrogen atoms. There are several advantages associated with the cured polyepoxide resin of this invention and these advantages include:

- an ability to produce a producing having excel lent chemical and moisture resistance which is well suited for civil engineering and industrial coating applications;
- an ability to produce a product polyepoxide resin having excellent flexibility and impact strength;
- an ability to produce a product polyepoxide resin, while having a high degree of elongation or elasticity with reduced levels of flexibilizer;
- an ability to formulate a cured polyepoxide resin which has low volatile organic content (VOC), thus minimizing environmental dangers associated with many flexibilized polyepoxide resin systems; and,
- an ability to form environmentally safe polyepoxide resins which will cure at ambient temperature and yet have good elastomeric properties without compromising moisture and chemical resistance.

DETAILED DESCRIPTION OF THE INVENTION

In producing a formulation for the curable polyepoxide resin, a recommended formulation for producing the flexibilized polyepoxide resin is as follows:

1. Polyglycidyl ether of an aromatic alcohol, i.e., a phenol type component- 40 to 100 parts by weight;
2. Monofunctional and aliphatic, aliphatic ether or ester amine reactive component - 10 to 40 parts by weight;
3. Acrylate-terminated urethane prepolymer-10 to 40 parts by weight;
4. Aliphatic amine curative having from 3 to 10 epoxide reactive hydrogen atoms-0.6 to 1.5, preferably 0.9 to 1.1 equivalents amine hydrogen per equivalent of amine hydrogen reactive component present in components 1, 2, and 3 above.

Only through a selected combination of four key ingredients, (1) polyglycidyl ether of a phenol type compound; (2) monofunctional and aliphatic, aliphatic ether or ester amine reactive component (2) acrylate terminated urethane prepolymer as a flexibilizing additive, and (4) an amine curative having at least 3 epoxide reactive hydrogen atoms, can the highly elastomeric epoxy resins having the excellent physical properties be generated.

The polyepoxide useful for practicing the present invention are those polyglycidyl ethers of phenolic type compounds having terminal 1,2-epoxy groups. The epoxide equivalents of these glycidyl ethers is greater than one and the equivalent weight ranges from 150 to 10000. Polyglycidylethers of diphenylol propane or bisphenol A are particularly suited as polyepoxides for the production of coatings and resin products for civil engineering applications. Others include polyglycidyl ethers of phenol/formaldehyde and bisphenol/formaldehyde novolacs as well as the polyglycidyl ethers of tri (hydroxyphenyl)methane and tetra (hydroxyphenyl) ethanes and propanes.

The monofunctional and aliphatic amine reactive component used in the polyepoxide formulation is an aliphatic component having an amine hydrogen reactive substituent. The aliphatic component is monofunctional in that it reacts only with a single hydrogen of the amine group and thus, it is a chain blocking agent, as opposed to a crosslinking agent, thus reducing the level of cross-links in the final polyepoxy resin product. The amine hydrogen reactive substituent of the monofunctional and aliphatic amine reactive component can be virtually any substituent which is reactive with an amine hydrogen atom present in the amine curative. Typically the monofunctional and aliphatic amine reactive component used in forming the polyepoxide resin is a monofunctional epoxide or monofunctional acrylate. Also, monofunctional aliphatic isocyanates may be used. Examples of monofunctional epoxides are include the glycidyl ethers of the aliphatic alcohols, such as, butyl, pentyl, hexyl, 2-ethylhexyl, octy, nonyl and $C_{12}$ to $C_{14}$ alkanols. Of these the glycidyl ether of $C_{12}$ to $C_{14}$ alkanols is preferred. Examples of monofunctional acrylates which also can be utilized include the $C_1$ to $C_8$ alkyl esters of acrylic and methacrylic acid and these include methylmethacrylate, ethylacrylate, 2-ethylhexylacrylate, butyl acrylate or the corresponding methacrylates. Examples of monofunctional isocyanates include hexane isocynate, ethylhexylisocyanate, and the like.

The flexibilizing component of the polyepoxide resin product is based upon an acrylate terminated urethane such as those described in U.S. Pat. Nos. 3,297,745; 4,390,662; 4,719,268; 4,486,582 and 4,618,658, these patents being incorporated by reference. Acrylate-terminated urethane prepolymers which comprise the reaction product of an isocyanate terminated urethane prepolymer and an isocyanate reactive acrylate or methacrylate. Isocyanate terminated prepolymers are prepared by reacting a polyfunctional isocyanate, typically an aromatic diisocyanate with a polyol, preferably a long chain polyether or polyester polyol, such as the ethylene and propyleneoxide adducts of $C_2$ to $C_4$ polyols. For enhanced flexibilization of the polyepoxide resin, the molecular weight of the polyol should range from about 400 to 3000, preferably 1000 to 2000. Flexibilizers utilizing a polyol having a molecular weight of less than 1000 generally lead to extremely viscous flexibilizers. Higher molecular weight glycols tend to cause phase separation in the formulated epoxy leading to poor physical properties. The preferred polyisocyanate prepolymer is prepared by any known means, for example, a 2000 mw polypropylene glycol is reacted with an 80/20 2,4/2,6-toluenediisocyanate mixture. Any polyisocyanate such as methylenediphenyldiisocyanate (MDI), isophoronediisocyanate, (IPDI)or paraphenylenediisocyanate (PPDI) is also suitable.

The isocyanate-reactive acrylates and methacrylates typically used to prepare the acrylate terminated urethane prepolymers are hydroxy alkylacrylates and methacrylates and these include: hydroxyacrylates such as hydroxymethyl acrylate or methacrylate, hydroxypropyl acrylate or methacrylate, hydroxypentyl acrylate or methacrylate, 2-hydroxyethyl acrylate, 2-hydroxyethyl hexyl methacrylate, hydroxybutyl methacrylate and the like. Typically the ester portion of the acrylate or methacrylate is from a $C_{1-8}$ alcohol.

The aliphatic amine curative for forming the cured polyepoxide resin product is one having a plurality of amino hydrogen atoms, e.g., 3 to 10, and preferably 3 to 4, hydrogen atoms which are reactive with epoxide groups and the unsaturated groups of the acrylate terminated polyurethanes. Amine curatives having a higher proportion of hydrogen atoms and approaching the upper end of the above recited range tend to effect greater crosslinking than do amine curatives having lesser hydrogen atoms and the resulting epoxide products tend to be more rigid and exhibit lesser levels of elongation than do the polyepoxide resins cured with amine curatives having the lower levels within the middle of the range of amine hydrogen atoms. Typically, the amine curative will have from about 3 to 4 reactive hydrogen atoms and a molecular weight ranging from about 70 to 250. Examples of amine curatives include aminoethyl piperazine; N-methylethylenediamine; bis(-para-aminocyclohexyl)methane; isophorone diamine, ethylenediamine and polyethylenepolyamines such as triethylenetetramine, tetraethylenepentamine, pentaethylenehexamine; polyamidoamines based on fatty acid adducts of polyethylenepolyamines and so forth. Generally, any aliphatic or cycloaliphatic amine compound known to be an epoxy curative may be used in this invention. The preferred curatives are 1-(2-aminoethyl)piperazine (AEP); bis (para-aminocyclohexyl)methane (PACM), and isophoronediamine (IPD).

Several observations regarding formulation of the polyepoxide resin have been made that are valuable in determining the ultimate type of product desired. For example, the greater the amount of flexibilizer and/or monofunctional epoxide or acrylate the higher the percent elongation in the final product. The absence of flexibilizer results in an ambient cured epoxy with less than 15% elongation. If the monofunctional amine reactive component is absent, the level of flexibilizer generally must be increased to at least 70% of the formulation in order to produce an ambient cured epoxy with elongations of from 50 to 200%. The presence of the monofunctional epoxide or acrylate reduces the level of flexibilizing agent needed to as low as 20% while still maintaining good elongation properties, while the absence of monofunctional epoxide or acrylate leads to high viscosity and elongations of less than 15%. The amine curative, and its functionality, (the number of active hydrogens present in the amine curative) generally determines the level of flexibilizer and/or monofunctional epoxide or acrylate needed to obtain a given elongation. As the functionality of the curative is lowered, crosslinking is reduced and therefore the amount of flexibilizer and/or monofunctional epoxide or acrylate may be reduced to obtain a specified percent elongation.

The range of components based on one hundred twenty parts by weight of resin forming components, i.e., polyglycidyl ether of phenol, monofunctional and aliphatic amine reactive component, and acrylate terminated ureyhane prepolymer, excluding the amine curative, is from about 40 to 100, preferably about 50 to 70 parts by weight of polyglycidyl ether of a phenol; 10 to 40 parts of the monofunctional amine reactive component; and 10 to 40 parts of the arylate terminated urethane prepolymer. The level of amine curative component is largely dependent upon the physical properties desired. In many cases, a stoichiometric level, based on the equivalents epoxide in the polyglycidyl ether of phenol type compound, the monofunctional amine reactive compound and equivalents acrylate terminated urethane prepolymer (the resin forming components) may not be utilized. Generally, though, the amine curative is incorporated at a level to provide from 0.6 to 1.5, preferably 0.9 to 1.1, equivalents active amine hydrogen atoms per equivalent of the resin forming components. In the preferred embodiments, a polyglycidyl ether of bisphenol A having an equivalent weight from 150 to 250, a glycidyl ether of a $C_{12-14}$ alcohol; an acrylate terminated urethane having an equivalent weight of from 600 to 1800 is used and the amine curative is incorporated at a level capable of reaction with 0.9 to 1.1 equivalents amine hydrogen based on those equivalents in the resin forming components.

To summarize, the physical properties and particularly the degree of elasticity is generally dependant upon the ratio of flexibilizer and monofunctional epoxide or acrylate. Although the functionality of the amine curative determined by the number of active hydrogens present is a factor, control of elasticity is primarily maintained via the monofunctional amine reactive component. The flexibilizing additive supplies the soft or rubbery segment providing for the desired elasticity. The monofunctional epoxide or acrylate acts as a capping agent reducing the amount of cross-linking through the amine curative and as the degree of cross-linking is reduced the elasticity of the cured epoxy is increased. The amount of cross-linking may also be controlled through the amine curative functionality. Amines with high levels of available hydrogens for cross-linking generate less elastic epoxies.

The following examples are provided to illustrate various embodiments of the invention and are not intended to restrict the scope thereof. All parts or parts by weight or percentages are expressed as weight percentages unless otherwise specified.

EXAMPLE 1

Preparation of Acrylate Terminated Urethane Flexibilizer

A clean round bottom 3-neck reaction flask is purged with nitrogen and charged with 2.1 moles of 80/20 2,4-/2,6-toluenediisocyanate and 1.0 g of MEHQ (a polymerization inhibitor). The contents are heated to 70° C. under nitrogen atmosphere and agitation. 1.0 mole of the desired polyol, such as 1000, 2000, 3000, or 4000 mw polypropylene glycol, is added slowly over a 2 hr. period while maintaining the temperature between 70° and 80° C. The temperature is held in this range for 6 hr. with agitation. The reaction solution is cooled to 50° C. and 1.0 mole of 2-hydroxyethyl acrylate (HEA) is then added. After thorough mixing, 2 g of a commercial tin catalyst, i.e., dibutyltindilaurate is added with vigorous agitation. The resulting exotherm causes the temperature to rise from 50° to 75° C. The reaction temperature is held at 75° C. for 1 hr. at which time the reaction solution is analyzed by IR for unreacted isocyanate, If the isocyanate content is less than 0.1%, the product is cooled and collected. If it is not, the reaction solution is heated for an additional hour and reanalyzed. The addition order of the above example may be reversed without detriment to the final product. The HEA may be added to the TDI followed by PPG addition, Caution must be noted. Tile exotherm from the HEA addition can cause a temperature rise of over 100° C. Therefore, the addition rate must be carefully controlled. The resultant reaction product of 2-hydroxy ethyl acrylate and a TDI-PPG 2000 isocyanate terminated urethane prepolymer is recovered as used hereinafter as the flexibilizer component.

EXAMPLE 2

Preparation of Cured Epoxy Test Specimens Effect of Amine Curative

The elastomeric epoxy is prepared by thoroughly mixing the flexibilizer, monofunctional and aliphatic amine reactive component, and epoxy resin. After degassing at 10 mm Hg, an equivalent amount of amine curative based on the number of available active hydrogens is added to the resin and mixed thoroughly. The resulting solution is allowed to cure at ambient temperature for 7 days in the desired mold shape. The test specimens are die cut and the tensile properties determined according to the ASTM D-638 protocol. Tables 1-3 show the reactants and effect on the physical properties of the polyepoxide resin cured with aminoethylpiperazine (AEP), methylene bis(cyclohexylamine) (PACM) and isophoronediamine curatives (IPD) respectively.

TABLE 1

EFFECT OF CURATIVE ON PHYSICAL PROPERTIES

| COMPOUND | Runs | | | |
|---|---|---|---|---|
|  | 1 | 2 | 3 | 4 |
| EPON 828 | 70 | 70 | 70 | 70 |
| EPODIL 748 | 0 | 10 | 20 | 20 |
| HEA-TDI-2000 PPG | 30 | 30 | 30 | 0 |
| AEP | 16.8 | 18.3 | 19.8 | 18.8 |
| SHORE D | 82 | 79 | 68 | 85 |
| TENSILE STRENGTH (PSI) | 6600 | 4600 | 3600 | 9251 |
| TENSILE MODULUS (PSI) | 159500 | 80120 | 62113 | 438700 |
| ELONGATION (%) | 11 | 30 | 69 | 3 |

TABLE 2

| COMPOUND | Runs | | | |
|---|---|---|---|---|
|  | 1 | 2 | 3 | 4 |
| EPON 828 | 70 | 70 | 70 | 70 |
| EPODIL 748 | 0 | 10 | 20 | 20 |
| HEA-TDI-2000 | 30 | 30 | 30 | 0 |
| PACM | 20.6 | 22.4 | 24.2 | 23.0 |
| SHORE D | 85 | 81 | 62 | 85 |
| TENSILE STRENGTH (PSI) | 4500 | 4800 | 2700 | 9116 |
| TENSILE MODULUS (PSI) | 139000 | 85310 | 67590 | 398100 |
| ELONGATION (%) | 4 | 22 | 110 | 3 |

TABLE 3

| COMPOUND | Runs | | |
|---|---|---|---|
|  | 1 | 2 | 3 |
| EPON 828 | 70 | 70 | 70 |
| EPODIL 748 | 0 | 20 | 0 |
| HEA-TDI-2000 PPG | 30 | 30 | 0 |
| IPD | 19.5 | 20.7 | 17.6 |
| SHORE D | 84 | 77 | 85 |
| TENSILE (PSI) | 7284 | 3000 | 7305 |
| MODULUS (PSI) | 526000 | 58220 | 321500 |

TABLE 3-continued

| COMPOUND | Runs | | |
|---|---|---|---|
|  | 1 | 2 | 3 |
| ELONGATION (%) | 2 | 43 | 4 |

Tables 1, 2, & 3 show the affect of the Example 1 flexibilizer, HEA-TDI-2000 PPG, and monofunctional epoxide, EPODIL 748, on the elasticity of the formulated epoxy resin cured with AEP, PACM and IPD respectively. Tables 1, 2, & 3 show that the absence of either flexibilizer (Runs 4 in Tables 1 and 2 and Run 3 in Table 3) or monofunctional amine reactive epoxide (Runs 1 in Tables 1, 2 and 3) yields an epoxy with very low percent elongation relative to the other reported formulations. When both are present much improved percent elongation is obtained. And as levels of monoepoxide is increased, independent of amine curing agent the percent elongation also increases. The latter portion of each table gives the tensile properties of the cured resins, which are good for the application.

EXAMPLE 3

Effect of Molecular Weight of Polyol on Properties

The procedure of Example 2 was repeated except that the molecular weight of the polyol was varied. Table 4 details how the PPG molecular weight used in the preparation of the acrylate terminated urethane affects the tensile properties of the resultant ambient cured epoxy. Table 4 sets forth the condition and results using triethylenetetramine (TETA) as the amine curative.

TABLE 4

EFFECT OF PPG POLYOL MOLECULAR WEIGHT ON PROPERTIES

|  | PPG POLYOL MOLECULAR WEIGHT | | | | | |
|---|---|---|---|---|---|---|
|  | 192 | 425 | 1000 | 2000 | 3000 | 4000 |
| EPON 828 | 50 | 50 | 50 | 50 | 50 | 50 |
| EPODIL 748 | 20 | 20 | 20 | 20 | 20 | 20 |
| HEA-TDI-PPG | 50 | 50 | 50 | 50 | 50 | 50 |
| TETA | 12.4 | 11.6 | 10.7 | 10.0 | 9.7 | 9.5 |
| APPEARANCE | CLEAR | CLEAR | CLEAR | CLEAR | CLOUDY | OPAQUE |
| SHORE D | 75 | 74 | 55 | 52 | 45 | 25 |
| TENSILE (PSI) | 5149 | 3335 | 1198 | 1100 | 234 | 305 |
| MODULUS (PSI) | 110100 | 77470 | 17120 | 16650 | 2751 | 1452 |
| ELONGATION | 12.5 | 40.8 | 80.5 | 49.6 | 41.7 | 60.6 |

The data shows that when the molecular weight of the PPG is at or above 3000 phase separation occurs and a significant loss in tensile properties is observed. When the PPG molecular weight is low, a significant loss in the percent elongation is observed. The highest percent elongation at the same concentrations is observed when the PPG molecular weight is between 425 and 2000.

EXAMPLE 5

Effect of Flexibilizer on Properties

The procedure of Example 2 was repeated except that the concentration of flexibilizer was varied over a wide range. Tables 5-7 provide results of these runs wherein the epoxy resins are cured with AEP, PACM, and IPD respectively.

TABLE 5
EFFECT OF HEA-TDI-2000 PPG CONCENTRATION ON PROPERTIES AMBIENT CURED WITH AEP

| COMPOUND | Runs | | | |
|---|---|---|---|---|
| | 1 | 2 | 3 | 4 |
| HEA-TDI-2000 PPG | 30 | 40 | 50 | 60 |
| EPODIL 748 | 20 | 20 | 20 | 20 |
| EPON 828 | 70 | 60 | 50 | 40 |
| AEP | 19.8 | 17.9 | 15.9 | 14.0 |
| SHORE D | 68 | 62 | 50 | 45 |
| TENSILE STRENGTH (PSI) | 3600 | 2200 | 1700 | 990 |
| TENSILE MODULUS (PSI) | 62113 | 44300 | 24660 | 4477 |
| ELONGATION (%) | 69 | 103 | 119 | 130 |

TABLE 6
EFFECT OF HEA-TDI-2000 PPG CONCENTRATION ON PROPERTIES AMBIENT CURED WITH PACM

| | | | |
|---|---|---|---|
| EPON 828 | 70 | 60 | 50 |
| EPODIL 748 | 20 | 20 | 20 |
| HEA-TDI-2000 PPG | 30 | 40 | 50 |
| PACM | 24.2 | 21.8 | 19.5 |
| SHORE D | 62 | 60 | 58 |
| STRENGTH (PSI) | 2700 | 2300 | 1700 |
| MODULUS (PSI) | 67590 | 34810 | 21140 |
| ELONGATION (%) | 110 | 106 | 126 |

TABLE 7
EFFECT OF HEA-TDI-2000 PPG CONCENTRATION ON PROPERTIES AMBIENT CURED WITH IPD

| | Run 1 | Run 2 | Run 3 |
|---|---|---|---|
| EPON 828 | 70 | 60 | 50 |
| EPODIL 748 | 20 | 20 | 20 |
| HEA-TDI-2000 PPG | 30 | 40 | 50 |
| CURATIVE | 19.6 | 17.9 | 15.9 |
| SHORE D | 77 | 72 | 62 |
| TENSILE STRENGTH (PSI) | 4200 | 2200 | 1500 |
| TENSILE MODULUS (PSI) | 58220 | 40640 | 11290 |
| ELONGATION (%) | 60 | 97 | 123 |

These results show that elongation increases with an increase in concentration of flexibilization agent. Properties of the resulting epoxy resin, in terms of tensile strength and modulus remain good.

EXAMPLE 6

Effect of Concentration of Monofunctional Amine Reactive Reactant

The procedure of Example 2 was repeated except that the level of monofunctional and aliphatic amine reactive reactant, i.e., the glycidyl ether of a $C_{12-14}$ alkanol was varied. Table 8 to set forth the conditions and results when cured with AEP.

TABLE 8
EFFECT OF EPODIL 748 CONCENTRATION ON TENSILE PROPERTIES

| | AMBIENT CURED WITH AEP | | |
|---|---|---|---|
| HEA-TDI-2000 PPG | 50 | 50 | 50 |
| EPODIL 748 | 20 | 30 | 40 |
| EPON 828 | 50 | 50 | 50 |
| AEP | 15.9 | 17.4 | 18.9 |
| SHORE D | 50 | 40 | 38 |
| TENSILE STRENGTH (PSI) | 1700 | 1200 | 560 |
| TENSILE MODULUS (PSI) | 24660 | 11360 | 512 |
| ELONGATION (%) | 119 | 155 | 152 |

EXAMPLE 7

Effect of Amine Functionality on Properties

The effect of the functionality of various amine curatives on the properties of the cured epoxy resin. Table 9 sets forth the conditions and results for the curatives.

TABLE 9

| CURATIVE | MEDA | AEP | EDA | DETA | TETA | TEPA |
|---|---|---|---|---|---|---|
| EPON 828 | 70 | 70 | 70 | 70 | 70 | 70 |
| EPODIL 748 | 20 | 20 | 20 | 20 | 20 | 20 |
| HEA-TDI-2000 | 30 | 30 | 30 | 30 | 30 | 30 |
| CURATIVE | 11.4 | 19.8 | 6.9 | 9.5 | 10.1 | 12.4 |
| SHORE D | 68 | 68 | 65 | 65 | 70 | 65 |
| TENSILE (PSI) | 800 | 3600 | 2272 | 2764 | 2249 | 2636 |
| MODULUS (PSI) | 73870 | 62113 | 48750 | 61260 | 38650 | 58000 |
| ELONGATION (%) | 60 | 69 | 41 | 30 | 32 | 31 |

MEDA = N-METHYL ETHYLENEDIAMINE;
AEP = AMINOETHYL PIPERAZINE;
EDA = ETHYLENEDIAMINE;
DETA = DIETHYLENETRIAMINE;
TETA = TRIETHYLENETETRAMINE;
TEPA = TETRAETHYLENEPENTAMINE.

Table 9 shows the effect of functionality or the number of available active hydrogens in the amine curative for the ethylene amine series. As the number of active hydrogens increases through the series the % elongation decreases. This is the result of increased cross-linking. Once the degree of cross-linking reaches a certain level the % elongation becomes constant as shown for DETA, TETA, and TEPA. By the addition of a monofunctional epoxide such as Epodil 748 glycidyl ether to the resin forming components, excluding amine curative, the present elongation of an ambient cured epoxy can be increased from about 9% to about 30%.

EXAMPLE 8

Effect of Monofunctional Amine Reactive Component

The procedure of Example 2 was repeated except that the monofunctional amine reactive reactant was varied. Tables 10 and 11 set forth the results.

TABLE 10

| MONOAMINE REACTANT | EPODIL 748[1] | EPODIL 746[2] | EPODIL 742[3] | CAR-DURA E[4] |
|---|---|---|---|---|
| EPON 828 | 70 | 70 | 70 | 70 |
| HEA-TDI-2000 PPG | 30 | 30 | 30 | 30 |
| DILUENT | 20 | 20 | 20 | 20 |
| AEP | 19.8 | 20.8 | 21.6 | 20.4 |
| SHORE D | 68 | 72 | 80 | 77 |
| TENSILE STR. (PSI) | 3600 | 3800 | 2400 | 4200 |
| TENSILE MOD. (PSI) | 62113 | 66020 | 310214 | 74200 |
| ELONGATION | 69 | 65 | 1 | 27 |

TABLE 10-continued

| MONOAMINE REACTANT (%) | EPODIL 748[1] | EPODIL 746[2] | EPODIL 742[3] | CAR-DURA E[4] |
|---|---|---|---|---|

[1] Epodil 748 is a trademark used to identify the glycidyl ether of a $C_{12-14}$ alcohol.
[2] Epodil 746 is a trademark used to identify the glycidyl ether of a 2-ethylhexanol.
[3] Epodil 742 is a trademark used to identify the glycidyl ether of a o-cresol.
[4] Cardura E is a trademark used to identify the glycidyl ester of versatic acid.

The above results show that the aromatic epoxide, o-cresol was ineffective in imparting elasticity to the resulting cured epoxy resin. This is somewhat surprising since it would have reduced cross-link density to the same extent that was effected by the aliphatic ether and ester epoxides. The monofunctional amine reactive component, Cardura E, provided mildly elastic epoxy resins.

TABLE 11

EFFECT OF MONOFUNCTIONAL ACRYLATE ON ELASTICITY

| MONOFUNCTIONAL DILUENT | 2-ETHYLHEXYL ACRYLATE | LAURYL ACRYLATE |
|---|---|---|
| EPON 828 | 70 | 70 |
| HEA-TDI-2000 PPG | 30 | 30 |
| DILUENT | 20 | 20 |
| AEP | 21.5 | 20.4 |
| SHORE D | 70 | 63 |
| TENSILE STR. (PSI) | 2700 | 3600 |
| TENSILE MOD. (PSI) | 158100 | 116800 |
| ELONGATION (%) | 88 | 102 |

The results show that the higher molecular weight acrylate, lauryl acrylate, resulted in a higher % elongation that the lower molecular weight 2-ethylhexylacrylate. This most likely is due to a lower cross-link density. Tensile strength remained high.

What is claimed is:

1. In a curable epoxy resin comprising a polyglycidyl ether of a phenol having terminal 1,2-epoxy groups and an amine curative, the improvement for enhancing elasticity of the resulting epoxy resin which comprises, in combination therewith:

a monofunctional aliphatic, aliphatic ether or ester amine reactive component, and an acrylate terminated urethane prepolymer and an amine curative having from 3 to 10 epoxide reactive hydrogen atoms.

2. The epoxy resin of claim 1 wherein the polyglycidyl ether of a phenol is the polyglycidyl ether of bisphenol A.

3. The epoxy resin of claim 2 wherein the resin comprises:

a) from 40 to 100 parts by weight polyglycidyl ether of phenol;

b) from 10 to 40 parts by weight monofunctional and aliphatic, aliphatic ether or ester amine reactive component;

c) from 10 to 40 parts by weight of acrylate terminated urethane prepolymer; and d) from about 0.6 to 1.5 equivalents of amine hydrogen per equivalent of amine hydrogen reactive group in components (a), (b) and (c).

4. The epoxy resin of claim 3 wherein the monofunctional amine reactive component is selected from the group consisting of an aliphatic glycidyl ether or ester, or a $C_1$-$C_{18}$ alkyl ester of acrylic or methacrylic acid.

5. The epoxy resin of claim 4 wherein the aliphatic amine curative is selected from the group consisting of aminoethyl piperazine, bis(paraaminocyclohexyl) methane, N-methylethylenediamine; isophorone diamine, and ethylene amines selected from the group consisting of ethylenediamine, triethylenetetramine, tetraethylenepentamine, and pentaethylenehexamine.

6. The epoxy resin of claim 5 wherein the acrylate terminated urethane prepolymer is the reaction product of a hydroxy acrylate with an isocyanate terminated prepolymer formed by the reaction of an isocyanate selected from the group consisting of toluenediisocyanate, methylenedi(phenylisocyanate) and isophoronediisocyanate and a polyether polyol selected from the group consisting of polyethylene glycol, polypropylene glycol or polytetramethylene glycol, 7. The epoxy resin of claim 6 wherein the acrylate terminated urethane prepolymer is formed by the reaction of tolenediisocyanate and polypropylene glycol where the molecular weight of the polypropylene glycol is from 400 to 2000.

8. The epoxy resin of claim 7 wherein the ratio of reactive amino hydrogen atoms to amino hydrogen reactive groups is from 0.9 to 1.1.

9. The epoxy resin of claim 7 wherein the equivalent weight of the polyglycidyl ether of phenol is from 150 to 1000.

10. The epoxy resin of claim 8 wherein the equivalent weight of the acrylate terminated urethane prepolymer is from 600 to 1800.

11. The epoxy resin of claim 9 wherein the amine curative has a molecular weight of from 70 to 250.

12. The epoxy resin of claim 8 wherein the aliphatic monofunctional reactant is a glycidyl ether of a $C_{12}$ to $C_{14}$ alcohol, 13. The epoxy resin of claim 12 wherein the aliphatic amine curative is a polyethylene polyamine selected from the group consisting triethylene tetramine and tetraethylene tetramine.

14. The epoxy resin of claim 6 wherein the isocyanate used to produce the acrylate terminated urethane prepolymer is methylenedi(isocyanate).

* * * * *